United States Patent [19]

Rosenbaum

[11] Patent Number: 4,509,911
[45] Date of Patent: Apr. 9, 1985

[54] COUPLING STRUCTURE AND METHOD AND APPARATUS FOR ITS MANUFACTURE

[75] Inventor: Larry A. Rosenbaum, Findlay, Ohio

[73] Assignee: Hancor, Inc., Findlay, Ohio

[21] Appl. No.: 512,368

[22] Filed: Jul. 11, 1983

Related U.S. Application Data

[62] Division of Ser. No. 356,939, Mar. 11, 1982, Pat. No. 4,480,855.

[51] Int. Cl.³ .................. B29C 17/07; B29D 23/03
[52] U.S. Cl. .................................. 425/532; 264/508; 264/564; 285/3; 285/423; 425/539; 425/325; 425/326.1; 425/336
[58] Field of Search ............... 264/508, 564; 425/535, 425/532, 527, 539, 325, 326.1, 336, 233, 290; 249/52; 285/3, 4, 2, 423

[56] References Cited

U.S. PATENT DOCUMENTS

| 3,793,421 | 2/1974  | Paubandt  | 264/157  |
|-----------|---------|-----------|----------|
| 3,859,025 | 1/1975  | Maroschak | 425/532  |
| 3,891,733 | 6/1975  | Maroschak | 264/40.7 |
| 3,919,367 | 11/1975 | Maroschak | 264/508  |
| 3,929,359 | 12/1975 | Schmunk . |          |
| 4,003,685 | 1/1977  | Maroschak | 425/532  |
| 4,247,136 | 1/1981  | Fouss et al. | 285/319 |

FOREIGN PATENT DOCUMENTS

| 1704644 | 2/1971 | Fed. Rep. of Germany | 425/539 |
| 2455967 | 1/1981 | France | 264/564 |

Primary Examiner—Jan Silbaugh
Assistant Examiner—Hubert C. Lorin
Attorney, Agent, or Firm—Fay & Sharpe

[57] ABSTRACT

A plurality of internal couplers (A, B, C, D) are integrally connected end to end in a single tubing construction of indeterminant length. Between each coupler is an annular, frangible region (14, 24) of thin plastic. In the field, the individual couplers are readily broken manually from the tubing construction. Each coupler includes a plurality of cleats (40) which are partially surrounded by a region (50) of relatively thin plastic material. The couplers are manufactured by continuously blow molding a sleeve of softened plastic into the tubing construction of indeterminent length.

4 Claims, 8 Drawing Figures

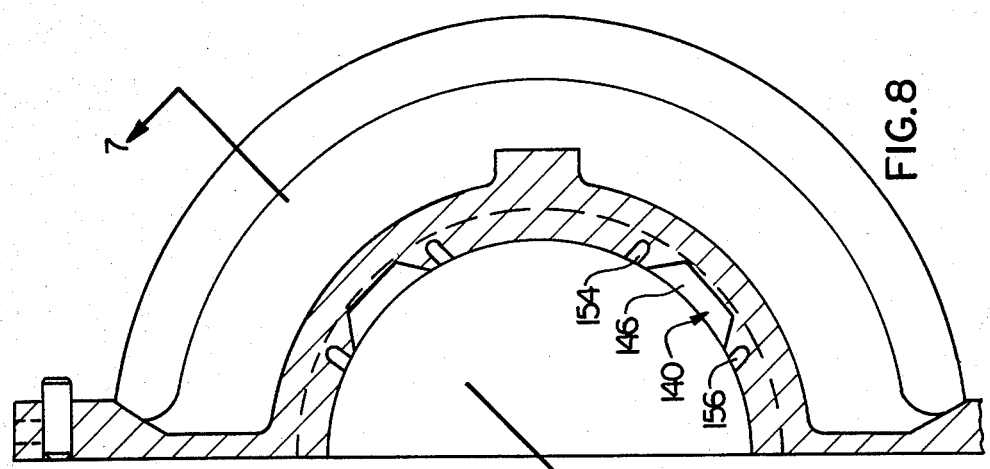
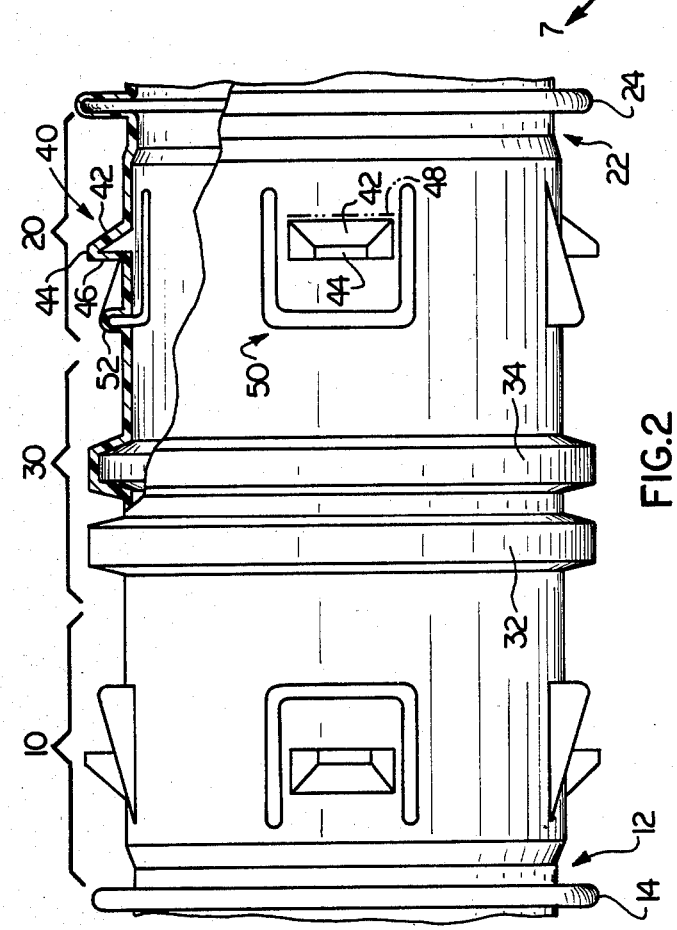
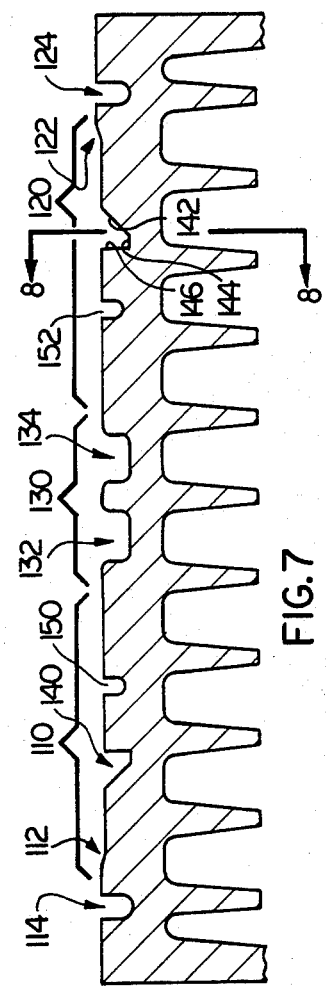

4,509,911

COUPLING STRUCTURE AND METHOD AND APPARATUS FOR ITS MANUFACTURE

This is a division of application Ser. No. 356,939, filed Mar. 11, 1982, now U.S. Pat. No. 4,480,855.

BACKGROUND OF THE INVENTION

This application is directed to the art of pipe joints and couplings and more particularly to joint or coupling structures for plastic pipe or tubing. The invention is particularly applicable to internal couplers for connecting adjacent ends of corrugated plastic pipe or tubing and will be described with particular reference thereto. However, it will be appreciated that the invention has broader applications and may be incorporated as an integral part of the tubing, may be sized and configured to accommodate connecting tubing of different sizes and shapes with associated structures, may be used with other fittings, and the like.

Corrugated plastic pipe or tubing is widely used for many types of domestic, agricultural, and industrial drainage and waste disposal systems. This pipe or tubing is typically molded of high density polyethylene, polyvinyl chloride, or the like. The pipe itself is commonly cylindrical, although other shapes are also used, and has corrugated internal and external wall surfaces defined by adjacent circumferentially extending, longitudinally spaced peaks and valleys. When installing corrugated pipe or tubing in the ground, it is often necessary to connect the ends of two tubing lengths or to connect the end of one tubing length with an associated structure.

Heretofore, various types of joints or couplers have been developed for connecting the ends of the tubing. One particularly successful coupler is described in U.S. Pat. No. 4,247,136, issued Jan. 27, 1981 to James L. Fouss, Donald W. Sting, John J. Parker, and Robert Biango, and assigned to the assignee herein. This prior art coupler is particularly advantageous for use in conjunction with automated conduit laying machinary. The coupler provides a secure connection which is not readily separated by automated, machine handling. Further, the coupling creates an internal connection without external features which may interact adversely with the automated handling machinary.

Although this prior art internal coupler has been relatively successful, it is relatively time consuming and labor intensive to manufacture. Commonly, the couplers are individually molded. After the molding operation, end walls which are formed by the mold ends are sawn off and slots around the outward projecting cleats are individually cut or punched.

The present invention contemplates a new and improved coupler which is adapted to be manufactured by continuous blow molding techniques. The invention further contemplates a continuous blow molding apparatus and method for manufacturing couplers.

SUMMARY OF THE INVENTION

In accordance with the present invention, there is provided a tubing construction comprising a plurality of tubing couplers wich are interconnected end to end by frangible portions.

In accordance with another aspect of the invention, there is provided a coupler having projecting cleat portions. Partially surrounding each cleat portion is a region of relatively thin material to facilitate flexing of the cleat as the coupler engages an associated tubing structure or the like.

In accordance with another aspect of the invention, there is provided a method for manufacturing fittings. The method comprises extruding a substantially continuous sleeve of plastic material, molding the extruded sleeve substantially continuously into a plurality of fittings which are interconnected end to end.

In accordance with yet another aspect of the invention, there is provided an apparatus for manufacturing fittings. The apparatus includes an extruder for extruding a sleeve of plastic material and a continuous molding appparatus for continuously blow molding the extruded sleeve into a plurality of interconnected fittings.

A primary advantage of the present invention is that it enables couplers to be manufactured rapidly with relatively little overhead in machinery, time, or labor.

Another advantage of the present invention is that the couplers are produced in interconnected lengths which are relatively easy to ship and handle.

Yet other advantages of the present invention will become apparent to others upon reading and understanding the following detailed description of the preferred embodiment.

BRIEF DESCRIPTION OF THE DRAWINGS

The invention may take form in various parts and arrangements of parts as well as in various steps and arrangements of steps. The FIGURES are for purposes of illustrating a preferred embodiment of the invention only and are not to be construed as limiting the invention.

FIG. 2 is a side elevational view in partial section of a coupler in accordance with the present invention;

FIG. 7 is a sectional view of a mold block of the continuous blow molding apparatus of FIG. 5; and, FIG. 8 is a transverse sectional view through section 8—8 of FIG. 7 of a mold block in accordance with the present invention.

DETAILED DESCRIPTION OF THE PREFERRED EMBODIMENT

Figure 1:
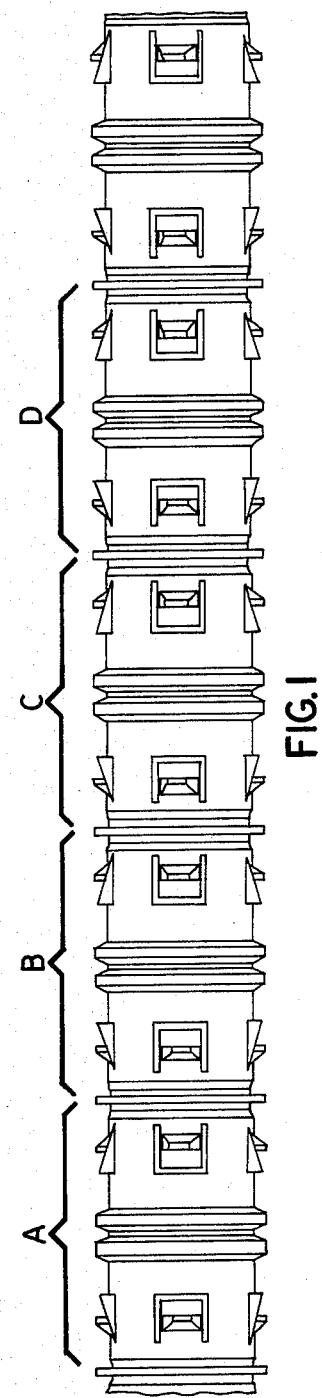
FIG. 1 illustrates a tubing-like construction of interconnected couplers in accordance with the present invention.

With refrence to FIG. 1, a tubing construction of indeterminate length includes a first fitting A which is interconnected with a second fitting B which is interconnected with a third fitting C which is interconnected with a fourth fitting D and so forth. With continuing reference to FIG. 1 and particular reference to FIG. 2, fitting B is described in detail and it is to be appreciated that the description applies by analogy to the other fittings. In the preferred embodiment, the fittings are all couplers of like construction but it is to be appreciated that other fittings such as adaptor couplers for connecting tubings of different sizes or shapes, or the like are also contemplated. Further, all fittings need not be the same.

The coupler B has a first tubular end portion 10 which has a first annular edge region 12 which is connected with coupler A by a severance zone. More specifically, an annular, frangible region or portion 14 is molded with the severance zone between the first edge region 12 and the coupler A. The frangible region is a thin annular projection of plastic which is sufficiently thin that it is readily severed or ripped manually.

Opposite the first end portion 10, the coupler B has a second tubular end portion 20. The second end portion 20 terminates in a second annular edge region 22 which is severably connected with the coupler C. In the preferred embodiment, the second edge region 22 is connected with a second annular, frangible region or projection 24. The second frangible region 24 is a projection of thin plastic which is sufficiently thin that it can be readily broken manually.

In the preferred embodiment, the first and second frangible regions 14 and 24 project outward, although it is to be appreciated that an inward frangible projection provides the same frangible function. Optionally, the frangible region may include intermittent perforations, an annular tear strip, or the like. Upon breaking the annular frangible projection, the remnants of the projection may be pulled off by hand, trimmed with a sharp knife, or the like. Because the annular projection is so thin, the remnants may be left on without interfering with the coupling operation. Alternately, if the couplers are to be severed in the factory rather than in the field, they may be cut apart with a saw or the like.

Disposed between the first and second end portions is a central portion 30. The central portion includes a plurality of corrugations including corrugations 32 and 34. The corrugations allow the central portion to undergo limited flexing motion and provide stops for the receipt of associated tubing structures on the first end portion 10 and second end portion 20.

Figure 3:
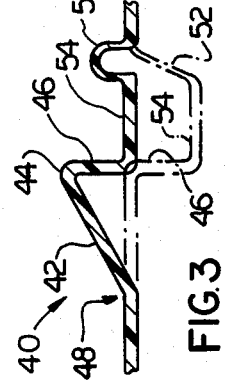
FIG. 3 illustrates a cleat construction of the coupler of FIG. 2 in a deflected, conduit receiving configuration.

Disposed on the first and second end portions are a plurality of cleat projections for engaging the corrugation of the connected tubing structures and like structures. In the preferred embodiment, the coupler B is an internal coupler and the cleats project outward to engage the interior of structures which are received around the first or second end portions. It is to be appreciated, however, that the invention is also applicable to external couplers in which the cleats project inward. Because each of the cleats is identical to the others in the preferred embodiment, the description is to be taken as applying by analogy to all cleats. For simplicity of illustration, corresponding parts of each cleat 40 are described with the same reference numerals. With particular reference to FIGS. 2 and 3, each cleat has a tapered rear wall 42 which tapers upward from the tubular end portion to an outer most end edge area 44. The rear wall faces the end edge region 12, 22 to engage corrugations and the like from tubing structures and other associated structures to be connected. As illustrated in phantom in FIG. 3, the rear wall is cammable substantially level with the surface of the end edge portion allowing the coupler to be received within the end of the tubing structure. The cleat further has a generally vertical engaging surface 46 facing the central portion 30 for engaging the interior of a corrugation of a connected tubing structure to inhibit it from being uncoupled. As the cleat is cammed toward the phantom position of FIG. 3, it pivots generally about a rear cleat mounting axis or hinge area 48 which is disposed between the rear camming surface 42 of the cleat and the end edge region.

Figure 4:
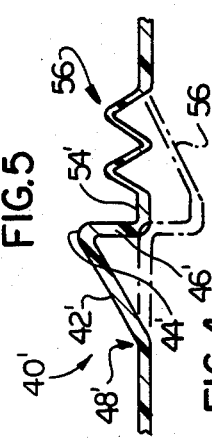
FIG. 4 is an alternate embodiment of a cleat construction in accordance with the present invention.

To facilitate bending of the cleat about the hinge area 48, a relatively thin, non-rigidly attached region 50 is defined partially surrounding the cleat. This non-rigidly attached region allows relatively free movement of the cleat about the hinge area 48. More specifically, the non-rigidly attached region 50 extends generally from the hinge area between the front cleat surface 46 and the central portion 30 and returns to the hinge area. The non-rigidly attached region 50 includes a projection of relatively thin plastic material which is able to flex, as shown in FIG. 3 sufficiently that the cleat may be bent around the hinge area. In the preferred embodiment, the non-rigidly attached region includes a generally semi-oval projection 52 of thin material. Optionally, the thin region may be frangible, perforated, or the like. Between the non-rigidly attached region and the cleat, a tab portion 54 is defined. The tab portion engages the inside surface of a connected tubing valley portion to inhibit the cleat from being cammed backward around the hinge area 48 under an axial uncoupling force against the front cleat surface 46. With reference to FIG. 4, the non-rigidly attached region 50' may have a generally S-shaped cross section, a double U-shaped cross section 56, or other cross sections which provide a relatively flexible elongated length of plastic material. In FIG. 4, like parts with the embodiment of FIG. 3 are marked with the same reference numerals followed by a prime (').

Figure 5:
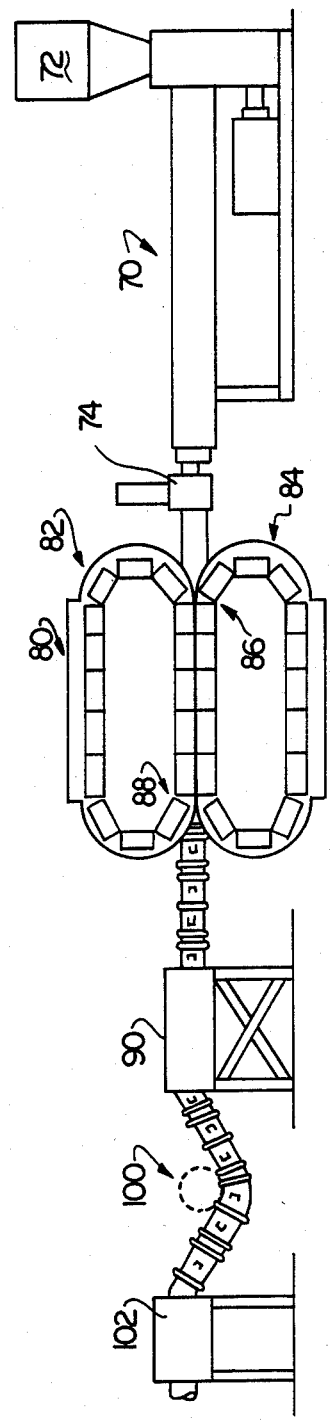
FIG. 5 illustrates an apparatus and method of manufacturing couplers and other fittings in accordance with the present invention.

With reference to FIG. 5, the tubing construction of indeterminate length illustrated in FIG. 1 is manufactured with a series of steps that includes extruding a sleeve of soft plastic material. An extruder 70 receives plastic pellets from a hopper 72 and subjects them to heat and pressure. Under the heat and pressure, the plastic pellets are turned into a plastic flow which is shaped by an extrusion die 74 into a substantially cylindrical sleeve of uniform wall thickness. Optionally, the extrusion die 74 may receive one or more flows of other plastic materials from other extruders, not shown, to shape a multi-layed sleeve of softened plastic. Multi-layered sleeves are advantageous in that they allow plastic with different physical properties to be combined in layers which retains the advantages of each physical property. Further, if it is desired that the coupler have a color other than black, the layered configuration allows the fitting or coupler to be constructed of a thin outer layer of relatively expensive colored plastic material and a thicker inner layer of relatively less expensive black or carbon filled plastic material.

The softened plastic sleeve is continuously molded into a tubing construction as illustrated in FIG. 1. In the preferred embodiment, the continuous molding is carried out by a blow molding apparatus 80, although other continuous molding apparatus, such as a continuous vacuum molding apparatus, are contemplated. As is conventional, the blow molding apparatus 80 includes two runs 82 and 84 of generally semicylindrical mold blocks which come together adjacent an upstream end 86 of the apparatus around the softened plastic sleeve. A source of pneumatic pressure within the interior of the softened plastic sleeve forces the sleeve against the mold blocks and into conformity with them. The runs of mold blocks are rotated at such a speed that the mold blocks move from the upstream end 86 towards a downstream end 88 at substantially the same speed as the extrusion means is extruding the plastic sleeve. In this manner, the mold blocks move with the plastic sleeve withdrawing heat from it until the sleeve has cooled sufficiently that it selfsustainingly retains its molded shaped. At the downstream end, the mold blocks separate and return to the upstream end. While separated, the mold blocks may be cooled with air or water such that they perform their function of withdrawing heat from the plastic sleeve more efficiently.

The conduit construction from the continuous molding apparatus 80 is still relatively warm and deformable. Accordingly, the tubing construction is next cooled to remove additional heat and solidify its shape. The cooling step is carried out with a water bath 90 which sprays a mixture of air and water on to the tubing construction. Optionally, other cooling devices, well known in the art, may be used. After the tubing construction is cooled, it may be wound into rolls or cut or broken into standardized lengths, such as 10 foot lengths, and bundled for shipment.

Figure 6:
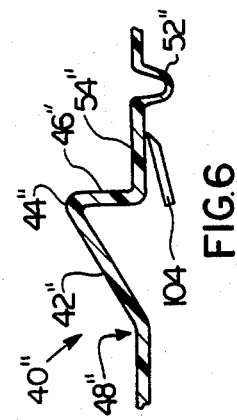
FIG. 6 is an alternate embodiment of coupler construction and illustrates an alternate method of manufacturer.

Optionally, the annular, frangible regions 14, 24, and the non-rigidly attached regions 50 may be formed into the tubing downstream from the cooling means rather than being molded into the tubing by the continuous molding means 80. For example, the cooled tubing may be passed around a dancer 100 to a cutting means 102. The cutting means may include a plurality of punches or piercing means for cutting U-shaped openings to form the non-rigidly attached region. Alternately with reference to FIG. 6 in which common elements with the tubing of FIG. 3 are denoted by the same reference numeral but followed by a double prime ("), the cleat 40" and projection 52" are molded to extend in opposite directions. The cutting means 102 includes a free floating blade 104 which severs the projection. Further, a plurality of slotting saws or other conventional slotting apparatus may cut a series of slots into the tubing construction at the frangible regions to create a perforated annular frangible portion which is readily broken manually. As yet another option, the coupling may be sawn completely through at the annular frangible portion and the discrete couplers boxed or otherwise packaged for shipment to the customers. Although these options are more labor or time intensive than the preferred embodiment of molding frangible portions into the couplers, they still represent a significant savings in time and labor over the prior art.

Each of the mold blocks in the first run 82 and the second run 84, in the preferred embodiment, are identical. Reference is now made to FIGS. 7 and 8 in which a longitudinal and a transverse cross section of a typical mold block are illustrated. The mold blocks have an inner surface facing the plastic sleeve which is a mirror image to the exterior surface of the fitting to be molded. When molding the coupler construction of the preferred embodiment, each mold block has a generally semicylindrical first mold block end portion 110. The first end portion 110 has a first end edge region 112 in which the diameter of the semicylinder contracts slightly to form a tapered end on the corresponding coupling to facilitate insertion into the end of the tubing. Adjacent the first end edge region 112, there is a first generally U-shaped semiannular recess 114 for forming the first annular, frangible projection 14. The first frangible region recess 114 has a relatively narrow longitudinal width compared to its radial depth such that a relatively small longitudinal length of the softened plastic sleeve is spread over a relatively large surface area within the semiannular frangible portion recess. This spreading of plastic sleeve by a relatively great amount renders it sufficiently thin that it is readily frangible.

The mold block has a second generally semicylindrical end portion 120 for forming the second tubular end portion 20. The second semicylindrical mold block end portion 120 has a second end edge region 122 at which the radius contracts slightly to form a tapered edge on the molded coupler. Adjacent the mold block second end edge region 120, there is a semiannular, second frangible portion recess 124 for forming the frangible projection 24. Again, the frangible portion forming recess has a relatively large surface area compared to its longitudinal width such that a relatively short longitudinal section of the softened plastic sleeve is spread over a relatively large surface area. The dimensions of the frangible portion forming recess are chosen such that the plastic is spread sufficiently thin that it is readily, manually frangible.

Disposed between the first and second mold block end portions is a mold block central portion 130. The mold block central portion 130 is a generally smooth semiannular surface with a pair of semiannular recesses 132 and 134 therein. The recesses 132 and 134 are shaped to have the softened plastic sleeve blown therein to form the corrugations 32 and 34 of the coupler. Optionally, the mold block central portion 130 may have a larger or smaller number of semiannular corrugation recesses to form a larger or smaller number of corrugations in the central portion of the coupler.

Also disposed in the mold block are a plurality of cleat forming recesses 140. Each recess has an inclined rear wall 142, a generally flat outer most area 144 and a generally vertical front wall 146. Partially encircling the cleat recess on all but the rear wall sides is a generally U or C-shaped recess 150. The recess 150 has a forward portion 152 adjacent the cleat forming recess 140 front surface 146 and a pair of side regions 154 and 156 extending from the recess forward portion generally adjacent or rearward of the cleat forming rear surface 142. The recess forward portion 152 is relatively narrow longitudinally compared to its interior surface cross section such that the plastic sleeve is spread over a relatively large surface area. This enables the cleat and tab portion to be flexed inward. The side portions 154 and 156 have progressively less depth toward the rearward surface 142 because these areas need to undergo less movement during flexing of the cleat. However, the side portions should have a sufficient depth to width ratio that the plastic is thinned until it is flexible or frangible. Optionally, the depth of the front and side portions may be so great in comparison to their width that the plastic sleeve is thinned to point of rupturing as it is forced by the pneumatic pressure into the recess.

The mold block interior surface may take on other configurations when other fittings are to be molded with the continuous molding technique of the present invention. Further, various other alterations may be made in the mold blocks. The length of the mold block is generally determined by the structure of the continuous molding machine. Depending on the length of the fitting to be molded and structure of the continuous molding machine, it may be possible to lengthen each mold block such that two or more fittings are molded by each mold block or it may be necessary to shorten or divide each mold block such that a plurality of mold blocks come together to mold each fitting. Although in the preferred embodiment the couplers are generally cylindrical, it is to be appreciated that the invention includes arched, semiround, triangular and other cross sectional shapes.

The invention has been described with particular reference to the preferred embodiment. Obviously, modifications and alterations will occur to others upon reading and understanding the preceeding detailed description of the preferred embodiment. It is intended that the invention be construed as including all such alterations and modifications which come within the scope of the appended claims of the equivalents thereof.

Having thus described a preferred embodiment of our invention, we now claim our invention to be:

1. An apparatus for manufacturing a continuous length of internal plastic couplers interconnected end to end, the apparatus comprising:
   extrusion means for extruding a softened plastic sleeve;
   continuous molding means for molding the softened plastic sleeve into the continuous length of interconnected internal couplers, the continuous molding means including at least two runs of mold blocks which come together around the softened plastic sleeve for continuously blow-molding the softened plastic sleeve into the length of interconnected couplers, the mold blocks including:
   a plurality of corrugation defining recesses disposed at regular intervals therealong and extending generally peripherally around the plastic sleeve for defining outward extending ribs centrally around each internal coupler,
   a plurality of cleat defining recesses disposed to either side of the central corrugation defining recess for defining a plurality of outward projecting cleats,
   a plurality of frangible portion defining recesses extending generally peripherally around the plastic sleeve, each frangible portion defining recess being disposed generally midway between adjacent central corrugation defining recesses, each frangible portion molding recess being relatively deep as compared to its longitudinal width such that a relatively short section of the softened plastic sleeve is spread over a relatively large surface area thinning the plastic received therein, and
   a plurality of ridge defining recesses each partially circumscribing an associated cleat defining recess, each ridge defining recess extending in part between the associated cleat defining recess and the closest central corrugation defining recess.

2. The apparatus as set forth in claim 1 further including a plurality of valley defining ribs, each valley defining rib being disposed closely adjacent one of the ridge defining recesses such that the thin plastic partially circumscribing each cleat has a generally S-shaped cross section.

3. An apparatus for manufacturing a continuous length of internal couplers, each internal coupler including generally opposed first and second end portions and a central portion disposed intermediate the first and second end portions, the first end portion having a plurality of firsts cleats extending outward therefrom, the intermediate portion having at least one rib or corrugation extending outward therefrom and peripherally therearound, and the second end portion having a plurality of second cleats projecting outward therefrom, the manufacturing apparatus comprising:
   extrusion means for extruding a sleeve of softened plastic material downstream therefrom;
   continuous molding means disposed downstream from the extruding means for molding the softened plastic sleeve into continuous array of internal couplers interconnected end to end, the molding means including:
   central portion molding means for molding coupler central portions including outward projecting peripheral ribs at regular intervals along the softened plastic sleeve,
   frangible portion molding means for molding peripherally extending frangible portions, the frangible portion molding means including a plurality of frangible portion defining recesses extending peripherally around the plastic sleeve, each frangible portion defining recess being disposed generally midway between an adjacent pair of central portion molding means, each frangible portion defining recess being relatively deep as compared to its longitudinal width such that a relatively short section of the softened plastic sleeve is spread over a relatively large surface area thinning the received plastic,
   first cleat molding means for molding the first plurality of cleats, the first cleat molding means being disposed downstream of the central portion molding means and upstream of the frangible portion molding means, the first cleat molding means including a sloping inner surface for providing each first cleat with a camming surface facing downstream from the adjacent frangible portion,
   second cleat molding means for molding the second plurality of cleats, the second cleat molding means being disposed upstream of the central portion molding means and downstream the frangible region molding means, each second cleat molding means including a sloping inner surface for providing each second cleat with a camming surface facing upstream toward the adjacent frangible portion.

4. An apparatus for manufacturing continuous lengths of interconnected internal plastic couplers, the apparatus comprising:
   an extrusion means for extruding at least a first plastic material into a softened plastic sleeve;
   continuous molding means for molding the softened plastic sleeve into a plurality of internal couplers interconnected end to end, the molding means including:
   corrugation molding means for molding at least one outward projecting corrugation generally centrally along each of the interconnected internal couplers,
   a plurality of frangible portion defining structures extending generally peripherally around the plastic sleeve, each frangible portion defining structure being disposed generally midway between adjacent corrugation molding means, each frangible portion molding structure having a relatively large surface area as compared to its longitudinal width such that a relatively short section of the softened plastic sleeve is spread over the relatively large surface area thinning the received plastic,
   first cleat molding means for molding at least a first cleat to a first side of the central corrugation of each interconnected coupler, the first cleat molding means molding a camming surface into each first cleat away from the central corrugation, second cleat molding means for molding at least a second cleat to another side of the central corrugation of each internal coupler, the second cleat molding means molding a camming surface into each second cleat facing away from the central corrugation, means for molding a relatively thin plastic projection partially circumscribing each first and second cleat, each partially circumscribing thin plastic projection being molded in part between each cleat and the central corrugation.

* * * * *